June 14, 1949.  R. W. DOEG  2,472,941
WEEDER
Filed March 28, 1946
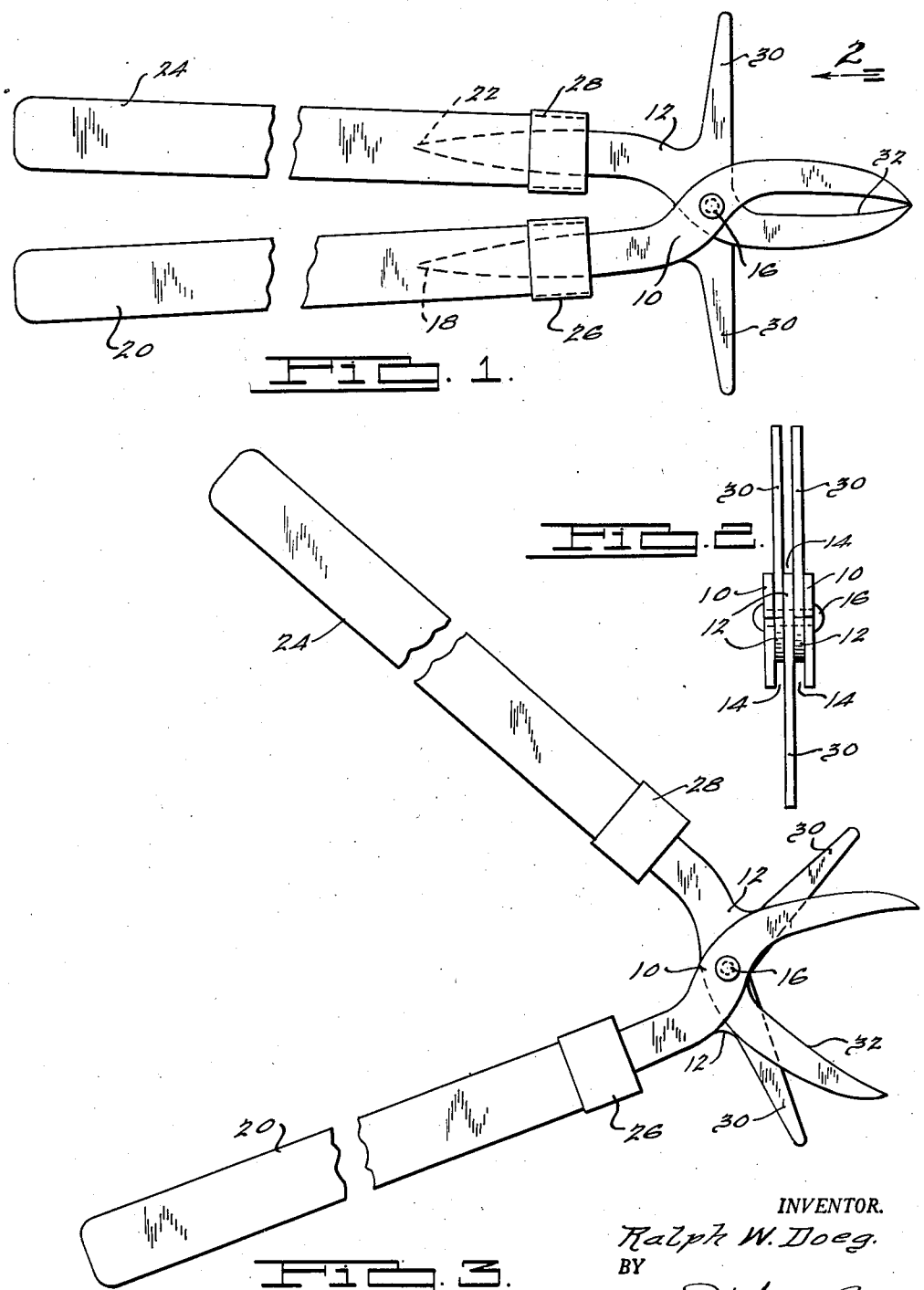
INVENTOR.
Ralph W. Doeg.
BY
Harness, Dickey & Pierce
ATTORNEYS.

Patented June 14, 1949

2,472,941

UNITED STATES PATENT OFFICE 2,472,941

WEEDER

Ralph W. Doeg, Highland Park, Mich.

Application March 28, 1946, Serial No. 657,873

5 Claims. (Cl. 294—50.5)

This invention relates generally to agricultural implements. More particularly, this invention relates to a weeder of novel and improved construction incorporating advantages not heretofore obtained.

Many weeds can easily be removed from their surrounding soil and completely destroyed without undue difficulty. Weeds, such as dandelion and plantain, however, have tap roots from which new plants may grow unless entirely removed. Roots of weeds such as these extend deeply into the earth and are difficult to remove, many becoming so firmly rooted that they cannot be removed by conventional means. As a result, it is common practice to remove the same by excavating the roots, generally resulting in mutilation of the lawn or garden from which it is desired to remove the same.

With the weeder of the present invention, such mutilation does not result as the tool provides pointed ends which can be forced into the earth and closed in grasping relationship upon a weed and its root, permitting extraction of the same with little or no disturbance of the surrounding soil or grass.

It is, therefore, a primary object of the present invention to provide a weeder that can be conveniently used for removing weeds from lawns with a minimum disturbance of the surrounding soil and grass.

Another object of the present invention is to provide a weeder having tines adapted to close upon a weed for removing the same from the earth and upon re-opening of said jaws after the weed has been extracted from the earth, dropping the weed along with the earth or weed particles which may cling to the sides of the tines.

A further object of the invention is to provide an implement of this character which is extremely simple in construction and may be made cheaply from metal stampings.

Further objects, advantages, and features of the present invention will becomes clearly apparent from the following specification, when considered in conjunction with the drawings forming a part thereof, and the claims hereinafter set forth.

In the drawings:

Figure 1 is a front, elevational view showing a weeder construction embodying the improvements of the present invention.

Figure 2 is an elevational view taken in the direction of arrow 2 indicated on Figure 1, illustrating the bottom construction of the weeder shown in Figure 1.

Figure 3 is a side elevational view of the weeder illustrated in Figure 1 with the handles thereof in an open position.

With more particular reference to the drawings, it will be readily apparent that the weeder specifically illustrated in the drawings and described below is illustrative only of one form of weeder which embodies the novel and improved features of the present invention.

While the particular material from which the improved weeder construction of the present invention may be fabricated forms no part of this invention, it has been found desirable to manufacture the jaws by individually stamping the tines thereof from sheet stock. Inasmuch as steel readily lends itself to such method of fabrication and is easily machined, it has been used for such elements of the weeder to be described herein. However, inasmuch as any material having suitable toughness and durability may be used and fabricated in any convenient manner, it is not intended that the invention be limited by the material or method used to manufacture the jaws.

In the broad aspects of the present invention, the jaws may be formed in any manner so long as the same are fork-like in construction and pivoted to close. For the purpose of illustration in this case, the jaws are shown as being assembled from individual pieces, which have been termed outer and inner tines for reasons of clarity of description. Therefore, it may be seen that the weeder of this invention provides outer tines 10 between which are positioned inner tines 12. In the construction shown, one of the inner tines is turned, and where more tines than here illustrated are used, alternate inner tines would thus be turned, as will hereinafter become more clear, to provide spaces 14. A rivet 16, extending through the tines thus assembled, holds the same together and serves as a pivot for the jaws.

In order to repeatedly open and close such jaws, handles which may be made of any suitable material, such as wood, are provided. The pointed ends 18 of tines 10 are imbedded in handle 20 along with a pointed end of the turned inner tine, which is not seen inasmuch as it lies directly behind the end of one of the outer tines as viewed in Figure 1. Similarly, the pointed ends 22 of tines 12 are imbedded in handle 24. Collars 26 and 28 are adapted to be slidably urged on handles 20 and 24 respectively, serving to cause the ends of said handles to contract and frictionally hold such pointed ends therein.

As may be seen in Figure 1, the tines are curved and are closed when the ends thereof are in line with the longitudinal axis of the weeder. The inner tines 12 are provided with integral spurs 30 which project outwardly from the inner faces 32 of such tines. It is pointed out, hereat, that spur 30 on the turned inner tine projects in a direction opposite to the spurs on the other inner tines because of such tine being turned. In a manner to be hereinafter described, such spurs sweep through spaces 14, scraping the tines clean of weed or earth particles when the handles are opened widely.

To remove a weed from the earth, handles 20 and 24 are moved away from each other, causing tines 10 and 12 of the jaws to spread. Such tines are then forced into the earth on opposite sides of a weed which it is desired to remove. When this is accomplished, the handles are brought together, closing the tines of the jaws upon the weed, in the manner of pliers, and the weeder moved upwardly, extracting the weed from the surrounding earth with a minimum of disturbance of surrounding soil or grass.

After removing the weed from the earth in this manner, handles 20 and 24 are again moved away from each other. However, this time, such handles are moved widely apart. Such movement causes spurs 30 to sweep through spaces 14, allowing the weed to drop from between the tines and causing the same to be cleaned of particles of weed or earth clinging thereto. This desirable feature makes it unnecessary to remove such particles by hand.

Therefore, it may be appreciated, that with the weeder of the present invention, it is possible to easily and quickly remove a weed from a lawn or garden with minimum disturbance to the surrounding soil or grass.

It will be clear from the foregoing description, that the weeder shown in the drawings and described above has been illustrated and described in rather specific detail. Obviously, many modifications, changes, and departures from the above described construction may be made without departing from the generic spirit and scope of the invention as set forth in the subjoined claims.

What is claimed is

1. In a weeder, the combination of, fork-like jaws pivoted to be operated in the manner of pliers, said jaws being formed by assembly of a plurality of tines, spurs integral with some of said tines and directed outwardly and forwardly therefrom, said spurs adapted to sweep through the spaces between the tines for cleaning dirt or weed particles therefrom, a pivot pin fastening said tines together, and a handle secured to each jaw.

2. In a weeder, the combination of, fork-like jaws pivoted to be operated in the manner of pliers, said jaws being formed of a plurality of tines, a pivot pin for fastening said tines together, spurs integral with some of the tines, each spur being forwardly directed with respect to the face of its respective tine and adapted to sweep through spaces between the tines for cleaning dirt or weed particles therefrom when the jaws are opened widely, and a handle secured to each jaw.

3. In a weeder, the combination of, fork-like jaws pivoted to be operated in the manner of pliers, said jaws being formed of a plurality of tines, a pivot pin for fastening said tines together, spurs integral with some of the tines, each spur being forwardly directed with respect to the face of its respective tine and substantially perpendicular thereto, said spurs adapted to sweep through spaces between the tines for cleaning dirt or weed particles therefrom, and handles secured to the jaws.

4. A weeder having fork-like jaws comprising inner and outer tines, a pivot pin extending through said tines, spurs integral with the inner tines and projecting outwardly from the face of the tine, and handles associated with said jaws for operating the same in the manner of pliers, said spurs sweeping through the spaces between the tines when said handles are moved widely apart.

5. A weeder having fork-like jaws comprising a plurality of individually formed inner and outer tines, a pivot pin extending through said tines, for assembling said tines and serving as a pivot for the jaws formed thereby, spurs integral with said inner tines projecting outwardly from the face thereof and substantially normal thereto, alternate inner tines being turned opposite to the others serving to cause the spurs thereon to be oppositely directed with respect to the spurs on said other inner tines, and handles operatively associated with said jaws for operating the same in the same manner of pliers.

RALPH W. DOEG.

REFERENCES CITED

The following references are of record in the file of this patent:

UNITED STATES PATENTS

| Number | Name | Date |
|---|---|---|
| 1,105,684 | Nuttall | Aug. 4, 1914 |